UNITED STATES PATENT OFFICE.

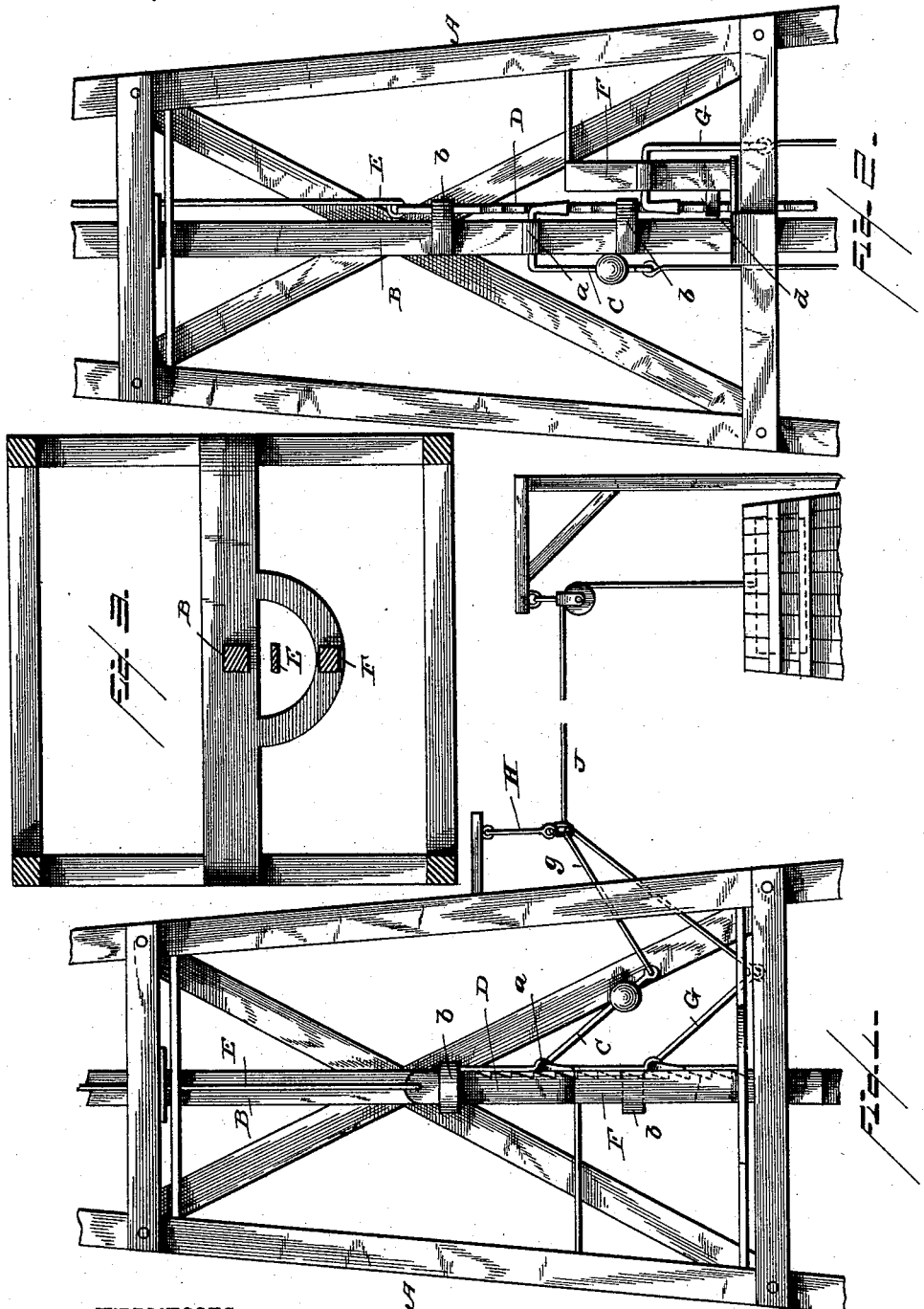

OSCAR COLVIN, OF BUCHANAN, MICHIGAN.

WINDMILL-REGULATOR.

SPECIFICATION forming part of Letters Patent No. 379,052, dated March 6, 1888.

Application filed September 3, 1887. Serial No. 248,721. (No model.)

*To all whom it may concern:*

Be it known that I, OSCAR COLVIN, a citizen of the United States, residing at Buchanan, in the county of Berrien and State of Michigan, have invented certain new and useful Improvements in Windmill-Regulators; and I do declare the following to be a full, clear, and exact description of the invention, such as will enable others skilled in the art to which it appertains to make and use the same.

This invention relates to improvements in devices for automatically throwing the operating mechanism of windmills into and out of gear, whereby a stoppage and starting of the pump may be effected when desired and without the care or attention of an attendant. These objects I accomplish by the means shown and illustrated in the accompanying drawings, in which—

Figure 1 is a side elevation of a portion of a tower, showing my improvements attached and in connection with a tank. Fig. 2 is a side view of the same, and Fig. 3 is a horizontal sectional view.

Referring by letter to the said drawings, A indicates a portion of a tower, which may support a wind-wheel of any ordinary or approved construction.

B indicates the plunger or pump-rod, which is designed to be attached to the crank-shaft or handle of a wind-wheel such as at present in use. This vertically-reciprocating rod B is provided with a bearing, $a$, in which is journaled a weighted dog, C, the biting end of which extends laterally from the said rod to engage a ratchet or toothed bar, as will be presently explained. To the opposite or lever end of this pawl C is attached a wire, the opposite end of which is designed to be attached to a wire which is connected with a float placed in a tank which may be used for watering stock or the like.

The pump-rod C is provided with a suitable number of horizontal guide-loops, $b$, for the passage of a vertically-movable bar, D, which is toothed on its vertical edge adjacent to the biting ends of the dogs. This toothed or rack bar D has secured to its upper end a rod, E, which is connected with the operating mechanism of a wind-wheel in any suitable manner. It should be here observed that this rod D has a vertical movement independent of the plunger or pump-rod; but by the engagement of the dog C with the teeth on the bar D the said bar and plunger will be caused to move together on the downstroke of the latter, when the said toothed bar will be engaged and held down by another dog, as will be now explained.

F indicates a vertical post which is fixed in the lower part of the tower and in close proximity to the plunger and rack-bar. This post is also provided with a guide-loop, $d$, which is vertically exposed and in the same vertical plane as the loops $b$ of the plunger-rod, and is also designed to receive the rack-bar D.

G indicates a dog which is of substantially the same form as the dog C, and is journaled in the post F in such a manner that its biting end may engage the teeth of the bar D, for a purpose which will be presently explained. This dog G has also attached to its lever end a wire, as shown, and this wire, together with the wire $g$ of the other dog, is fastened to a ring or the like on the lower end of a swing-wire, H, which depends from a bracket secured to the side of the tower, as shown. From the ring on the swing-wire H, I carry a wire, J, which passes through a pulley on an arm over a tank, and this wire has secured to its opposite end a float, K, which is to be placed in the tank and rise and fall with the water therein. The weight on the arm of the dog C is designed to take up any slack in the wire J.

In operation the pump-rod or plunger B is connected with the crank-arm of a wind-wheel. The upper end of the rod E is connected with the mechanism for throwing the wheel in and out of operation, or to and from the wind. It should be here observed that the dog C is journaled on and moves with the pump-rod or plunger, and that its biting portion is adapted to engage the teeth of the rack D on the downward stroke of the said rod. It should also be observed that the dog G is journaled on the fixed post F, and that its biting portion is also adapted to engage the teeth of the said bar D. These dogs are held out of engagement from the rack D through the medium of the float attached to the wire J, for it will be seen that when the tank in which the float is placed is filled or contains a certain quantity of water the float will rise therein, and through the medium of the said wire will lower the dogs and their biting ends in engagement with the rack; consequently a falling of the water in the tank will cause the floats to also fall and bring up the dogs out of the teeth of the rack. The teeth of the rack are arranged upwardly, so that the dogs will hold it from rising.

From the foregoing description it will be seen that when it is desired to pump water into the tank the floats therein will be at such a point as to hold the dogs out of engagement with the rack; but as the water rises to the desired height the dogs will be brought into action. The dog C, moving with the pump-rod, will engage the rack and carry it down on the downstroke of the said rod, but will free its engagement on the upstroke of the same, while the dog G, which is journaled in a fixed member, will engage the rack and hold it down until the water in the tank ascends; and when it is desirable to pump again the float, then rising with the water in the tank, will draw the dogs in engagement with the rack and throw the wheel out of action again and also the pump-rod.

Having described this invention, what I claim is—

1. The combination, with a wind-wheel and the pump-rod thereof, of a vertically-movable rack connected with the mechanism for throwing the wheel into and out of operation, a dog journaled on the said rod and actuated by a float and adapted to engage the rack, and a dog journaled in a fixed member and also actuated by the float and adapted to engage the said rack, substantially as specified.

2. The combination, with a wind-wheel, the pump-rod thereof, and the mechanism for throwing the wheel into and out of operation, of the guide-loops on the pump-rod, the fixed post F and the guide-loop thereon, in the same vertical plane as the loops b, the vertically-movable rack and the dogs journaled in the pump-rod and post, respectively, and a float whereby the said dogs may be thrown into and out of operation with the rack, substantially as specified.

In testimony whereof I affix my signature in presence of two witnesses.

OSCAR COLVIN.

Witnesses:
JOHN C. DICK,
M. B. GARDNER.